US011666829B1

(12) United States Patent
Rao et al.

(10) Patent No.: US 11,666,829 B1
(45) Date of Patent: *Jun. 6, 2023

(54) UTILIZING GAMING BEHAVIOR IN USER AUTHENTICATION

(71) Applicant: Wells Fargo Bank, N.A., San Francisco, CA (US)

(72) Inventors: Abhijit Rao, Irvine, CA (US); Edward J. Landers, Lafayette, CA (US); Byron G. Chun, Daly City, CA (US); Samuel B. Martin, San Francisco, CA (US); Michael H. Chang, Millbrae, CA (US); Traci H. Nguyen, San Francisco, CA (US); Douglas S. Pelton, Richmond, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 17/247,500

(22) Filed: Dec. 14, 2020

Related U.S. Application Data

(63) Continuation of application No. 15/251,367, filed on Aug. 30, 2016, now Pat. No. 10,864,444.

(51) Int. Cl.
*A63F 13/73* (2014.01)
*A63F 13/335* (2014.01)
(52) U.S. Cl.
CPC ............ *A63F 13/73* (2014.09); *A63F 13/335* (2014.09); *A63F 2300/201* (2013.01)

(58) Field of Classification Search
CPC .... A63F 13/63; A63F 13/79; A63F 2300/572; H04W 12/06; H04W 12/12; G06Q 20/4016; G06Q 30/0248
See application file for complete search history.

(56) References Cited

U.S. PATENT DOCUMENTS

| 8,370,389 B1 | 2/2013 | Dotan |
| 8,611,867 B2 | 12/2013 | Swanburg et al. |
| 8,677,472 B1 | 3/2014 | Dotan et al. |

(Continued)

OTHER PUBLICATIONS

"U.S. Appl. No. 15/251,367, Final Office Action dated Feb. 6, 2019", 17 pgs.

(Continued)

*Primary Examiner* — William H McCulloch, Jr.
*Assistant Examiner* — Ankit B Doshi
(74) *Attorney, Agent, or Firm* — Schwegman, Lundberg & Woessner, P.A.

(57) ABSTRACT

A system includes at least one hardware processor in communication with a gaming device and a memory storing instructions that, when executed by the at least one hardware processor, cause the at least one hardware processor to perform operations including receiving suspect gaming behavior data associated with a suspect user playing a computer game on the gaming device, comparing the suspect gaming behavior data to a user gaming behavior profile associated with another user, the user gaming behavior profile includes at least one component of behavior associated with the other user and the computer game representing a pattern of conduct of the other user, and based on the comparing, authenticating the suspect user for access to a target system as the other user.

20 Claims, 6 Drawing Sheets

(56) References Cited

U.S. PATENT DOCUMENTS

| | | | |
|---|---|---|---|
| 8,844,005 B2 | 9/2014 | Jakobsson et al. | |
| 8,863,307 B2 | 10/2014 | Sorek | |
| 8,892,461 B2 | 11/2014 | Lau et al. | |
| 8,938,787 B2 | 1/2015 | Turgeman | |
| 10,864,444 B1 | 12/2020 | Rao et al. | |
| 2007/0236330 A1* | 10/2007 | Cho | G06F 21/305 340/5.54 |
| 2010/0146622 A1* | 6/2010 | Nordstrom | G06F 21/554 726/23 |
| 2012/0173325 A1 | 7/2012 | Johri | |
| 2012/0258795 A1* | 10/2012 | Ryan | G07F 17/3206 463/29 |
| 2013/0024377 A1 | 1/2013 | Stong | |
| 2013/0229367 A1 | 9/2013 | Pinch | |
| 2013/0288647 A1 | 10/2013 | Turgeman | |
| 2013/0296039 A1 | 11/2013 | Engineer et al. | |
| 2014/0096196 A1 | 4/2014 | O'Connor et al. | |
| 2014/0207518 A1 | 7/2014 | Kannan et al. | |
| 2014/0297528 A1 | 10/2014 | Agrawal et al. | |
| 2015/0264572 A1 | 9/2015 | Turgeman | |
| 2017/0230363 A1 | 8/2017 | Deutschmann et al. | |

OTHER PUBLICATIONS

"U.S. Appl. No. 15/251,367, Non Final Office Action dated Apr. 2019, 18", 10 pgs.

"U.S. Appl. No. 15/251,367, Non Final Office Action dated Dec. 5, 2019", 7 pgs.

"U.S. Appl. No. 15/251,367, Notice of Allowance dated Aug. 14, 2020".

"U.S. Appl. No. 15/251,367, Pre-Appeal Brief Request for Review filed May 6, 2019", 5 pgs.

"U.S. Appl. No. 15/251,367, Response filed May 5, 2020 to Non Final Office Action dated Dec. 5, 2019", 10 pgs.

"U.S. Appl. No. 15/251,367, Response filed Aug. 20, 2018 to Non Final Office Action dated Apr. 19, 2018", 11 pgs.

Scindia, Padmaja, et al., "Exploring Games for Improved Touch-screen Authentication on Mobile Devices", (2016), 2 pgs.

U.S. Appl. No. 15/251,367 U.S. Pat. No. 10,864,444, filed Aug. 30, 2016, Utilizing Gaming Behavior in User Authentication.

* cited by examiner

UTILIZING GAMING BEHAVIOR IN USER AUTHENTICATION

CROSS-REFERENCE TO RELATED APPLICATION

This application is a continuation of U.S. patent application Ser. No. 15/251,367, filed Aug. 30, 2016, now issued as U.S. Pat. No. 10,864,444, which is incorporated by reference herein in its entirety.

TECHNICAL FIELD

Embodiments described herein generally relate to computer gaming and, for example and without limitation, to systems and methods for utilizing behavioral biometrics to authenticate players of computer games.

BACKGROUND

In the course of daily life, many people play computer games for entertainment. Players may play computer games on a variety of computing devices, such as traditional desktop computers, laptop computers, or mobile devices (e.g., smartphones, tablet computers, wearable devices, and so forth). There are many different types of computer games made available to players (i.e., game genres). Some games may be word-based games, or board-style games (e.g., turn-based games). Some may be strategy games, or action games, or puzzle games. Some games may be single-person games, while other games may be played with or against another person, or with or against multiple other people.

During game play, players make decisions and take actions that impact the outcome of the game. These decisions may be based on experience with the game, but may also be influenced by other factors.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
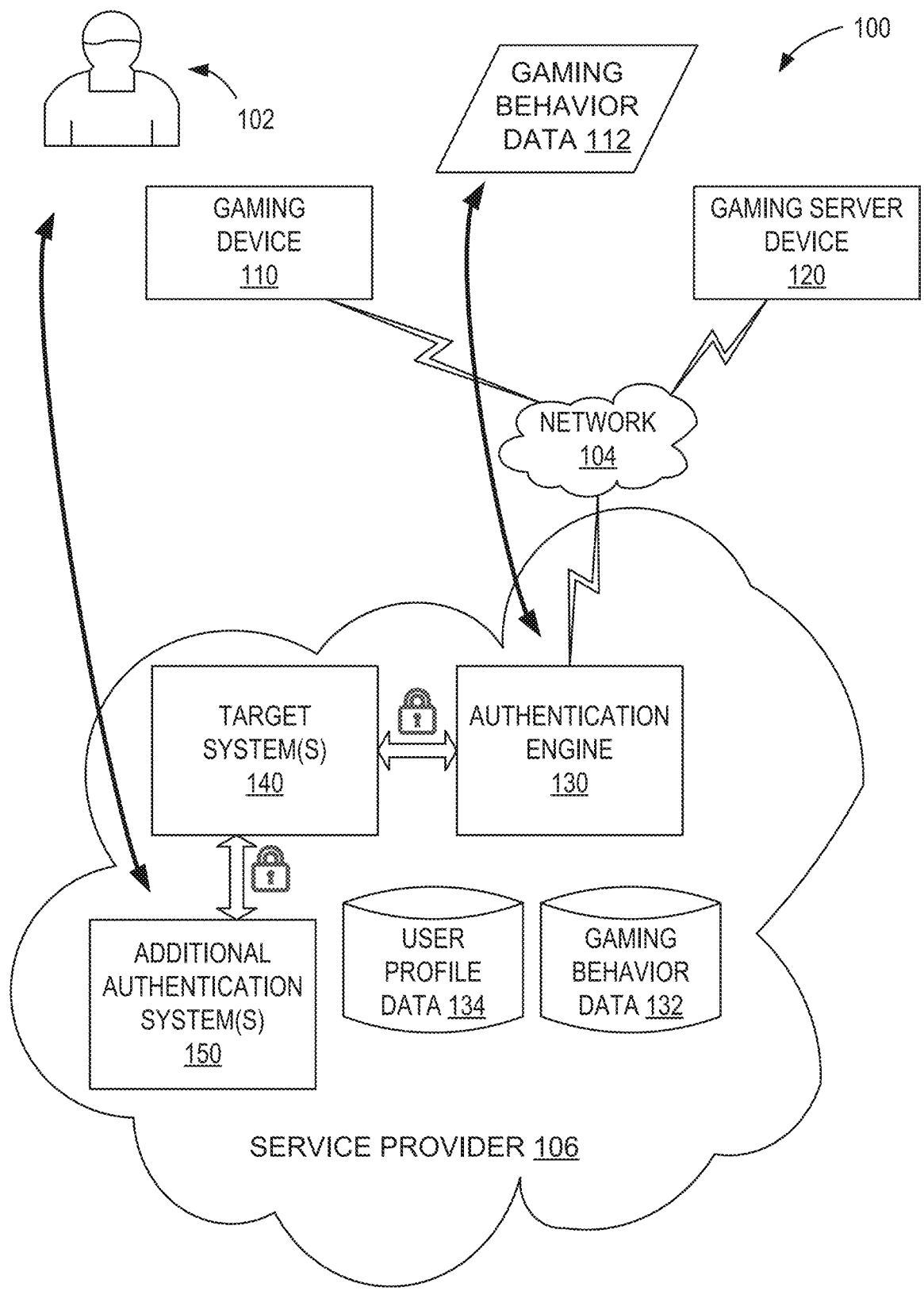
FIG. 1 illustrates an example networked environment including components of an authentication system for authenticating a user based on gaming behavior data.

As computer gaming continues to gain popularity, more people are finding particular computer games or types of computer games that they enjoy playing. As players spend time with computer games, they encounter decisions (e.g., during game play) and provide inputs to computer games that influence game play. An authentication system and method is described herein that uses behavioral biometrics to analyze gaming behavior of players relative to these computer games for authentication.

In some example embodiments described herein, a user ("player") selects a computer gaming application (or just "game") and plays the game during their normal day. The game may be provided to the player by computing devices such as a mobile device (e.g., as an app on the player's smartphone or tablet), a personal computer (PC) (e.g., as an application installed locally on the PC, or downloaded and executed as a web- or cloud-based application), a gaming console (e.g., Xbox, Playstation, Wii), and so forth (referred to herein as the "local gaming device," or just "gaming device"). Some computer games may also involve one or more other computing devices such as gaming servers (e.g., server devices enabling multi-person games, providing remote content, providing digital distribution services), or web services (e.g., server devices providing game content for web- or cloud-based games), gaming devices of other users (e.g., for multi-person games), and so forth. The computer game may be, for example, a traditional 2-dimensional (2D) or 3-dimensional (3D) game, or an augmented reality (AR) or virtual reality (VR) game.

In one example embodiment, the authentication system includes an authentication engine that provides authentication services for one or more target systems (e.g., servers, services, or other computing resources for which the player needs to be authenticated). The authentication engine collects gaming behavior data associated with the player over time (e.g., historical game play data) to, for example, establish patterns of conduct relative to computer games played by the player (referred to herein as the "authentic player"). During authentication operations, the authentication engine then uses these patterns of conduct to authenticate a "suspect player" for access to the target system(s) based on the suspect player's gaming behavior data (e.g., game play data collected during a later gaming session), determining whether or not the suspect player is actually the authentic player.

More specifically, the authentication engine receives gaming behavior data associated with the player playing one or more target computer games (or just "target games"). In the example embodiment, the authentication engine collects gaming behavior data for the authentic player (referred to herein as "authentic gaming behavior data") over time (e.g., during one or more gaming sessions, such as during an authentication configuration period). This authentic gaming behavior data is stored and associated with the authentic player, and is used by the authentication engine (e.g., as a collection) as a pattern of conduct for the authentic player. In other words, the authentic gaming behavior data represents some aspect of what the authentication system expects the authentic player to do (e.g., during later game play).

Once authentic gaming behavior data has been established for the authentic player, the authentication engine may then use the authentic gaming behavior data to authenticate a suspect player (e.g., for access to one or more of the target systems, or for functionality enablement that may benefit from seamless authentication checking). The authentication engine collects gaming behavior data of a suspect player (referred to herein as "suspect gaming behavior data," e.g., from, or otherwise associated with, the target games). The authentication engine compares the suspect game play data to the authentic gaming behavior data to determine whether the suspect player is the authentic player (e.g., an account holder on the target system). If the suspect gaming behavior data is similar to the authentic gaming behavior data (e.g., scoring within a pre-determined threshold), then the suspect player may be authenticated (e.g., confirmed) as the authentic player.

In some embodiments, this authentication based on gaming behavior data ("gaming-based authentication") may be used as the sole authentication mechanism, whereas in other embodiments, the gaming-based authentication may be used as one of several factors of authentication (e.g., as one of a two-factor authentication, such as, for example, along with a username/password), or may be used to enable the player to get access to (e.g., unlock) functionality such as features in the game, another app, links to a web site, or so forth.

In some embodiments, the authentication system may provide seamless, continuing authentication services using the gaming behavior data. For example, the authentic player may be using their tablet or smartphone, and may have recently authenticated successfully with a particular target system (e.g., by any means). Subsequently, they may be playing a game on their device, but may hand over the device to a friend (e.g., to share or show the game, or to enable their friend to play or view content). Under such transferred circumstances, the gaming behavior (e.g., of the friend) may be used in continuing authentication. Though the device had previously authenticated successfully as the authentic user, and may maintain such authentication (e.g., persist for a period of time), the authentication engine may use the subsequent gaming behavior provided by the friend, or by the authentic user, to determine whether or not such persistent authentication is maintained or expired (e.g., cancelled, revoked). In other words, the authentication engine may evaluate the gameplay of the friend, determine that gameplay to not match the authentic user, and expire the previous authentication. This may force the device to re-authenticate with the target system prior to performing any protected operations, thereby protecting the target system from unauthorized access by others having the authorized player's device.

In some embodiments, certain target systems may use two-factor authentication (2FA) scheme (e.g., prior to a first time payee creation), but may not use 2FA for subsequent operations (e.g., for later transfers). This authentication engine may be used to augment the subsequent operations by using suspect gaming behavior as an additional factor for authentication. Unsuccessful gaming behavior authentication may cause the targetsystem to re-authenticate the user (e.g., using 2FA).

FIG. 1 illustrates an example networked environment including components of an authentication system 100 for authenticating a user 102 based on gaming behavior data. The user 102 may also be referred to herein as a player 102, or as a consumer 102, depending on the context in which the user 102 interacts with the authentication system 100 (e.g., as a player of a computer game, or as a consumer of financial products or services). In an example embodiment, the authentication system 100 includes one or more gaming devices 110 (e.g., gaming devices local to the user 102) coupled in communication with an authentication engine 130 via a network 104 (e.g., the Internet), and multiple databases including gaming behavior data 132 and user profile data 134. In some embodiments, the authentication system 100 may also include one or more gaming server devices 120 (e.g., single server, cluster of servers) that, for example, provide game content or services to the gaming device 110. In the example embodiment, the authentication engine 130 authenticates the user 102 for access to one or more target systems 140 (e.g., financial services computing devices). In some embodiments, the target systems 140 and/or the authentication engine 130 may also leverage additional authentication systems 150 (e.g., for multi-factor authentication).

In the example embodiment, the gaming device 110 is a computing device with which the user 102 primarily engages with (e.g., purchases, executes, plays) a computer game (not separately shown in FIG. 1). In some embodiments, the gaming device 110 may be a personal computer of the user 102 (e.g., a desktop or laptop computer), or the gaming device 110 may be a mobile computing device of the use 102 (e.g., a tablet, a smartphone, a wearable computing device), or the gaming device 110 may be a console gaming device (e.g., Xbox, Playstation, Wii). The gaming device 110 may include one or more display devices (not separately shown, e.g., computer monitors, touch screen, virtual reality (VR) headset display) through which the user 102 views gaming content, as well as one or more input devices (e.g., keyboard, mouse, touchscreen, gamepads, microphone, motion sensor, camera, and so forth) through which the user 102 interacts with gaming content. The gaming device 110 may include additional hardware, and may be any computing device that enables the operation of the systems and methods described herein.

To perform authentication of the user 102, the authentication system 100 analyzes gaming behavior data 112 associated with game play of the user 102. The gaming behavior data 112 may be generated by the gaming device 110 or, in some embodiments, by the gaming server device 120. Gaming behavior data 112 may include aspects of physical behaviors ("physical behaviors data," e.g., nuances of physical actions or reactions made by the player 102 during game play), cerebral behaviors ("cerebral behaviors data," e.g., mental decisions consciously or unconsciously made by the player 102 during game play), interaction behaviors ("interaction behaviors data," e.g., teaming interactions, or in-game communication interactions between the player 102 and other players during game play), device behaviors ("device behaviors data," e.g., what type of device on which the player 102 plays the game, the particular device on which the player 102 plays the game, the type of input device(s) used while the player 102 plays the game), connectivity behaviors (e.g., does the player typically access the game via a conventional method, or via the dark net, or the TOR network, or other nefarious modes), cheating behaviors (e.g., does the player 102 regularly cheat or use scripted play methodologies), or any combination thereof.

Physical behavior data may include user behavior data associated with physical events performed by the user 102 during game play. Most computer games require the user 102 to interact with the computer game in some way. Physical behavior data relates to the inputs performed by the user 102, and may include real-world physical events or rendered events. Real-world physical events represent the inputs made by the user 102 while playing the game (e.g., via the input device(s)). Real-world physical events may include, for example, motion events performed by the user 102 via an input device of the gaming device 110 such as, for example, a keyboard, mouse, touch screen, controller, head-mounted display (HMD), motion sensor, and so forth, and may be tailored to the type of device used by the player 102 (e.g., whether the user 102 plays a particular game with a keyboard/mouse, or with a touchscreen, or with a hand-held gaming controller), or any combination thereof. The user 102 may, for example, move an avatar through a region of the computer game, and may input keystrokes of the keyboard, or motion or click events via the mouse, in order to cause the computer game to move the avatar. For another example, certain parts of game play that are repetitive maybe played with either keystrokes or mouse clicks, and the player's 102 selection of which to use may be physical behavior data. Rendered events represent the in-game events affected by the computer game based on the inputs provided by the user 102. Rendered events may include, for example, in-game changes made by the computer game in response to inputs from the user 102. For example, as the user 102 enters real-world physical events via the input devices, the computer game may cause events to be rendered within the game (e.g., affecting movement of the player's 102 avatar, or displaying a move made by the player 102, or otherwise changing the game environment presented to the player 102 based on user input). In some embodiments, the authentication engine 130 may monitor rate of speed of character movement or other indicators that may exhibit scripted or "bot" behaviors. Such an indication may cause the authentication engine 130 to not use such data in an authentic player profile, or to deny authentication of a suspect player.

Cerebral behavior data may include user behavior data associated with mental decisions made by the user 102. In many computer games, the user 102 is confronted with decision-points, where the user 102 may cause the game play to diverge based on in-game decisions made by the user 102. Outside of game play, the user 102 is also confronted with out-of-game decisions such as, for example, which game should they play, or when, or for how long they should play the game. Cerebral behaviors data relates to those user-made decisions related to the computer game, and may include in-game decision events or out-of-game decision events.

In-game cerebral events may include decision events in which the user 102 elects to pursue one course of conduct over others such as, for example, what move to make (e.g., electing to move a center pawn over a perimeter pawn in the game of chess), or what objective to pursue (e.g., electing to pursue completion of one quest over another), or how to spend time within the game (e.g., time spent crafting, or trading, or adventuring, or conversing), or how to accomplish a task (e.g., what in-game equipment to use, or an order in which to perform sub-tasks to complete the main task). For example, the kind of costumes the player chooses to wear on the avatar may be used as cerebral behavior data (e.g., whether the player selects shiny, gold, glittering costumes, or natural looking costumes such as feathers, leather, and so forth). For another example, in-game cerebral events may include reward-based behaviors performed by the player. Clicking on an urn during a challenge, for example, may generate 10 points for the player, whereas moving to a nearby forest and killing critters may generate 20 points for the player. Urns might appear and disappear fast, or may be limited to only 10 urns appearing in 15 seconds, whereas the critters might be slow moving, may require more clicks to kill them, may require searching for them, or may be limited to finding 5 critters in 15 seconds. A player may have a strong preference to go either for the critters or for the urns. Various factors may contribute to such reward-based behaviors, such as rules that decide how the rewards are given (e.g., tap the urn or search and kill the critter), or a reinforcing schedule that determines when the rewards are given (e.g., 10 urns in 10 seconds or 5 critters in 15 seconds, ratio of rewards). In some embodiments, the player's choice may be considered as consistent gameplay as long as the ratios are similar and there is a steady flow of such activities.

Out-of-game decision events may include decision data involving which game or games the user 102 elects to play (e.g., playing a particular game several times per day or week), or how long the user 102 elects to play particular games (e.g., playing a particular game for an average of 2 hours per day), when the user 102 elects to play the game (e.g., normally plays the game between 10 pm and midnight), on which device the user 102 elects to play the game, or at which physical location the user 102 elects to play (e.g., at home, while commuting, at a work or school location, determined using geolocation via IP, GPS, and so forth).

Interaction behavior data may include user behavior data associated with interactions between the user 102 and other players of the computer game. Many multi-player computer games include features enabling players to interact with each other in a variety of ways. Interaction behavior data relates to interactions between the user 102 and other players of the game, and may include communication events or teaming events. Communication events may include, for example, in-game messaging, mailing, texting, or voice (e.g., voice over IP) chatting between the user 102 and other players. For example, the user 102 may regularly text message a particular player or subset of other players, such as may be maintained by a "friends" list. For example, some games enable the players to annotate places visited in a game (e.g., providing a quick reminder for the player and/or the community or group). Players may have a tendency to annotate or share with others, and this may be used as a data point for interaction behavior data. Teaming events may include, for example, regularly playing with or against a particular player or other players (e.g., raid groups in a massively-multiplayer online (MMO) game, or a regular opponent in a 2-player turn-based boardgame-style computer game, or a regular partner in a bridge game), or willingness to go on a group challenge only during certain days of the week, or certain times of day.

Device behavior data may include user behavior data associated with the devices used by the user 102 while playing the computer game. There are many different types of gaming devices 110 (e.g., desktop or laptop PCs, tablets, smartphones, HMDs, console gaming systems, and so forth) that may support playing many different computer games. Further, some gaming devices 110 may be uniquely identifiable (e.g., unique processor or system IDs enabling, for example, distinction between whether the user 102 is playing on a first console gaming system or a second console gaming system), or may be type-identifiable (e.g., whether the gaming device 110, for example, is a Samsung® smartphone or a Sony Playstation®). In addition, many games or gaming devices 110 allow the user 102 to play the game using various different types of input devices (e.g., the user 102 may play the game via a keyboard/mouse combination, or purely with a keyboard, or with a touchscreen, or with a hand-held controller, or via an HMD, or combinations thereof). Device behavior data relates to the device(s) used by the user 102 during game play.

Some types of gaming behavior data 112 may involve multiple aspects of the above example behavior types. For example, in some embodiments, communication events may include both data regarding which other players the user 102 is communicating with (e.g., interaction type data) as well as keyboard keystroke patterns from the input device (e.g., physical behavior type data). Such data may be separated and analyzed independently, or in conjunction.

Players have a tendency to exhibit patterns of conduct (e.g., behavioral biometrics) while playing computer games. The systems and methods described herein analyze physical behavior data, cerebral behavior data, interaction behavior data, and/or device behavior data of the user 102 to authenticate the user 102 based on such patterns of conduct. Physical behavior data may be significant in authenticating the user 102 because players tend to exhibit certain input patterns (e.g., when performing particular tasks, or in certain in-game scenarios or situations). Cerebral behavior data may be significant in authenticating the user 102 because players tend to exhibit regular decision patterns (e.g., when making mental decisions regarding what to do, or what move to make, in certain in-game scenarios or situations). Interaction behavior data may be significant in authenticating the user 102 because players tend to communicate or otherwise interact regularly with certain other players. Device behavior data may be significant in authenticating the user 102 because players tend to play games on particular devices, or types of devices, or with particular input devices.

Figure 2:
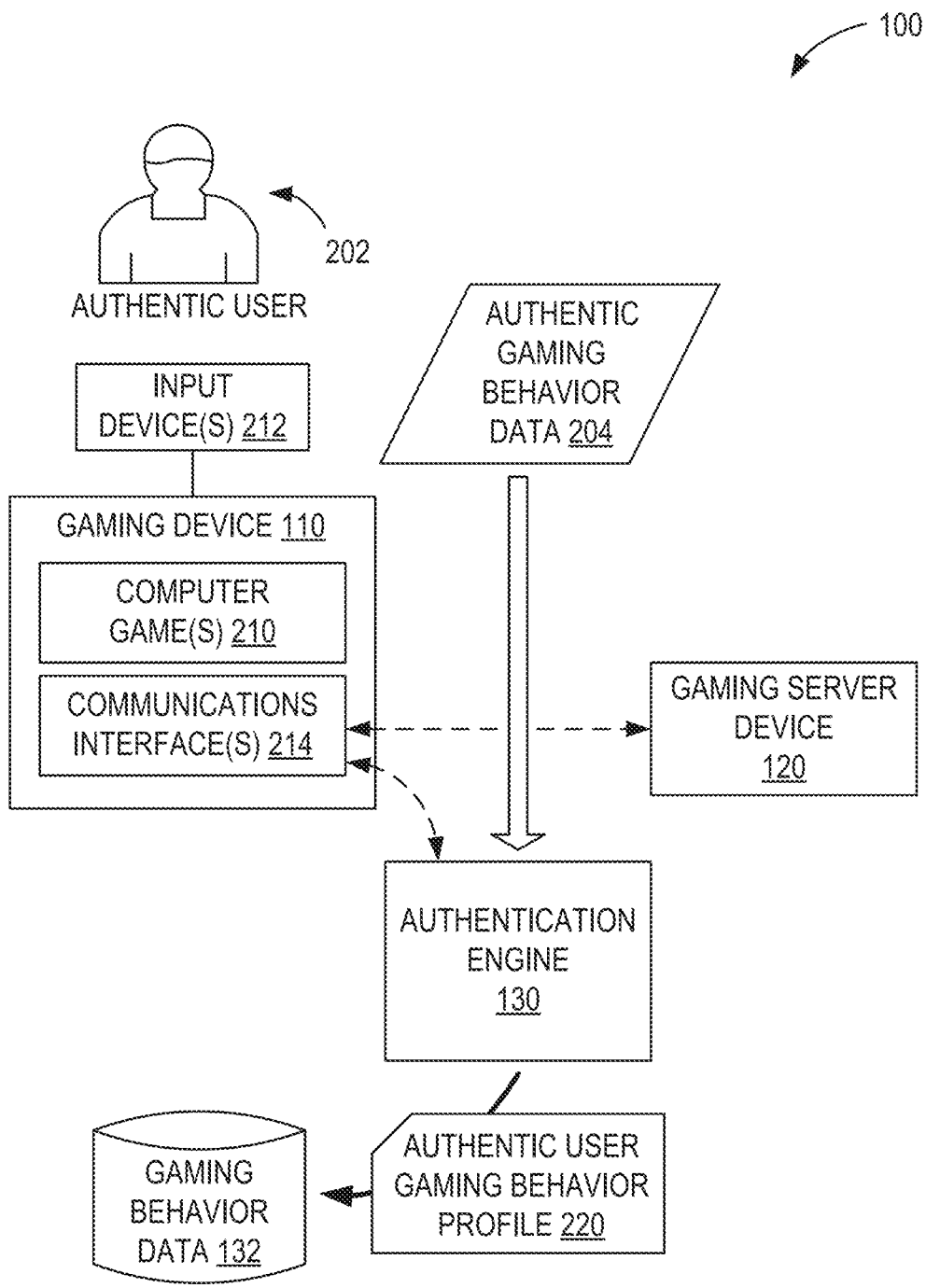
FIG. 2 illustrates an authentication configuration process in which the authentication system collects authentic gaming behavior data from an authentic user.
Figure 3:
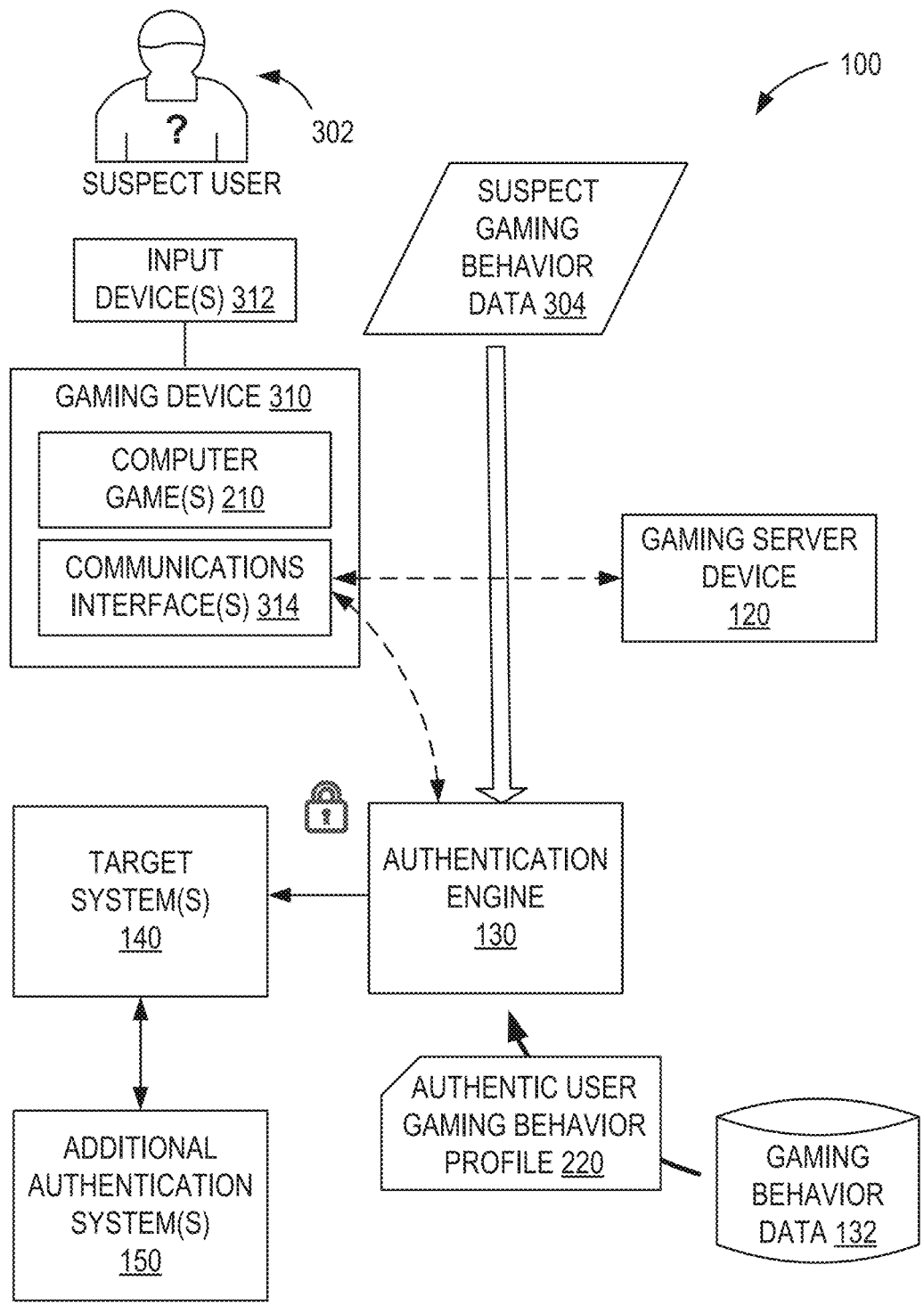
FIG. 3 illustrates an authentication application process in which the authentication engine collects and uses suspect gaming behavior data from a suspect user to generate an authentication decision related to the suspect user (e.g., whether the suspect user is the authentic user)

To perform such behavioral biometrics analysis, in the example embodiment, the authentication engine 130 performs two steps (e.g., with regard to a single player 102, such as the user 102). First, the authentication engine 130 collects authentic gaming behavior data (e.g., gaming behavior data 112 that is treated as originating from, and thus representing, the authentic user). FIG. 2 illustrates the gaming behavior collection process for the authentic user. Next, once the authentic gaming behavior data 112 has been collected for the authentic user, the authentication engine 130 may analyze gaming behavior data of a suspect user ("suspect gaming behavior data,"). FIG. 3 illustrates the process for authenticating a suspect user (e.g., as against the authentic gaming behavior data).

FIG. 2 illustrates an authentication configuration process in which the authentication system 100 collects authentic gaming behavior data 204 from a user ("authentic user") 202. The authentic user 202 may be similar to the user 102. In the example embodiment, the user 202 plays a computer game 210 via the gaming device 110 and, in some embodiments, the gaming server device 120. In some embodiments, the computer game 210 may be provided, in whole or in part, by the gaming server device 120 (e.g., a web game, a multi-player online game, via a digital distribution platform, or such). The user 202 uses one or more input devices 212 while playing the computer game 210, through which the user 202 interacts with the computer game 210 (e.g., moving an avatar within a computer game environment, or submitting moves, or communicating with other players through in-game communications features). The gaming device 110 also includes one or more communications interfaces 214 configured to, for example, allow networked communications between the gaming device 110 and the gaming server device 120, or the authentication engine 130 (e.g., via the network 104, not shown in FIG. 2).

In some embodiments, the gaming device 110 may include a client application (not separately shown), separate from the computer game 210, configured to capture and transmit gaming behavior data 204 to the authentication engine 130. In other embodiments, the computer game 210 may be configured to capture and transmit gaming behavior data 204 to the authentication engine 130. The authentication engine 130 may expose an application programming interface (API) allowing the gaming behavior data 204 to be "pushed" to the authentication engine 130, or the computer game 210 or client application may expose an API or enable RPC calls allowing the authentication engine 130 to "pull" the gaming behavior data 204 from the gaming device 110 or from the gaming server device 120.

During operation, the authentic user 202 plays the computer game 210 via the gaming device 110 and the input devices 212. During game play, gaming behavior data ("authentic gaming behavior data") 204 is generated (e.g., based on actions performed by the user 202). This authentic gaming behavior data 204 may be similar to the gaming behavior data 112 described above with respect to FIG. 1. Further, this gaming behavior data 204 is associated with the authentic user 202, and is stored in the gaming behavior database 132 (e.g., as an authentic user gaming behavior profile 220 for the authentic user 202).

More specifically, to create the authentic user gaming behavior profile 220, in the example embodiment, the authentication engine 130 initially collects gaming behavior data 204 during a configuration period (e.g., prior to use in authentication). The configuration period may be, for example, a period of one to three months. In some embodiments, the configuration period may be initiated by the authentic user 202 (e.g., expressly initiated through a client application interface, or through the computer game 210, or through a permission configuration setting). In some embodiments, the configuration period may be automatically initiated by the gaming device 110 or by the computer game 210 (e.g., upon installation of the computer game 210, or upon initial execution of the computer game 210, or upon account creation within the computer game 210). In some embodiments, the configuration period may be automatically initiated by the authentication engine 130 (e.g., upon first associating the gaming device 110 of the authentic user 202 with an account of the authentic user 202 within one of the target systems 140). The configuration period may be concluded at a pre-determined time, or after a pre-determined amount of gaming behavior data 204 has been collected. In some embodiments, gaming behavior data 204 may be collected and used across games (e.g., collected from one game, but used during game play of another game).

Once the configuration period has concluded, in the example embodiment, the authentication engine 130 provides authentication services for the authentic user 202 using the authentic user gaming behavior profile 220. In some embodiments, the authentication engine 130 may provide authentication services if a volume of authentic gaming behavior data 204 exceeds a pre-determined threshold (e.g., for a particular computer game 210). Authentication using gaming behavior data 204 may be stronger given a greater volume of behavior data from the authentic user 202. As such, if the user 202 has not provided enough authentic gaming behavior data 204, then the authentication engine 130 may determine not to provide authentication services for the authentic user 202 based on an insufficient volume of data, or quality of data (e.g., for a particular computer game 210, or for a particular physical, cerebral, or interaction behavior). For example, if the user 202 only played the game a few times over the configuration period, or only encountered a particular situation a few times within the game play sessions, then the data may be rendered insufficient.

In some embodiments, the authentic user gaming behavior profile 220 may be created by a profile creation event. For example, the authentication engine 130 and/or the computer game 210 may present one or more simulated behavior steps (e.g., mirroring a scenario the user 202 might naturally encounter within the game 210) to the authentic user 202. The user 202 may be instructed to perform some in-game behavior for purposes of capturing how the user 202 would conduct that behavior. The authentication engine 130 may then capture the behavior as performed by the authentic user 202 and generate the authentic user gaming behavior profile 220 based on the exhibited behavior. In some embodiments, the same or similar scenarios may be presented multiple times (e.g., to collect a larger base of data from which to build the profile 220 for a single aspect of gaming behavior). In some embodiments, the profile 220 may be built for multiple gaming behaviors by providing multiple different types of simulated behavior steps.

In some embodiments, to evaluate patterns of conduct regarding physical behaviors, the gaming behavior data 112, 204 may need to be tailored to a specific game. In other words, the gaming behavior data 204 may need to be specific to the computer game 210 based on the nature of the game 210. Use of physical behaviors in authentication may be enhanced if the particular physical behavior is regularly repeated (e.g., thereby giving a larger pool of data). For example, in a first-person shooter (FPS) type game, the authentication engine 130 may be configured to track timing of inputs related to a user aiming, firing, or reloading a gun (e.g., how the user 202 tracks a target through a gun sight, how the user 202 fires their gun, the timing for when the user 202 reloads their gun, and so forth). In games in which the user 202 controls an avatar, the authentication engine 130 may be configured to track how the user 202 moves their avatar within the computer game 210 (e.g., how the user 202 jumps, dodges, sprints, crouches, and so forth). As such, the authentic user gaming behavior profile 220 may include a behavioral aspect that identifies how the authentic user 202 typically physically acts or reacts while playing the particular computer game 210 based on nuances of motion provided via the input devices 212. Because, for example, players such as the authentic user 202 tend to perform actions in similar ways (e.g., with similar timings), this may be used to authenticate whether a suspect user (not shown in FIG. 2) is the authentic user 202.

In some embodiments, to evaluate patterns of conduct regarding cerebral behaviors, the gaming behavior data 112, 204 may need to be tailored to a specific game. For example, the authentication engine 130 may be configured to analyze patterns of conduct regarding how the user 202 spends their time within the computer game 210. The types of conduct may differ based on the particular game being played (e.g., based on the types of actions the game provides). In a fantasy MMO game such as World of Warcraft®, the authentication engine 130 may evaluate play of the user 202 based on categories of conduct such as, for example, when the user 202 is questing, or when the user 202 is raiding, or when the user 202 is trading, or when the user 202 is socially interacting with other players, or when the user 202 is participating in player-versus-player combat. In a game such as Minecraft®, the authentication engine 130 may evaluate play of the user 202 based on categories of conduct such as, for example, when the user 202 is resource gathering, or when the user 202 is combatting zombies, or when the user 202 is building, or when the user 202 is exploring. In an FPS game such as Battlefield 4, the authentication engine 130 may evaluate play of the user 202 based on categories of conduct based on, for example, which class the user 202 plays (e.g., assault, recon, engineer, or support), or which gun the user 202 uses. For each category, the authentication engine 130 may track the relative time spent by the user 202 performing each category (e.g., as a percentage of total time played). As such, the authentic user gaming behavior profile 220 may include a behavioral aspect that identifies how the authentic user 202 typically spends their time playing the particular computer game 210 based on a set of pre-determined types of conduct. Because, for example, players such as the authentic user 202 tend to spend similar amounts of time doing similar things (e.g., based on what they, as individuals, enjoy about the game 210), this may be used to authenticate whether the suspect user is the authentic user 202.

In some embodiments, to evaluate patterns of conduct regarding interaction behaviors, the gaming behavior data 112, 204 may need to be tailored to a specific game. For example, the authentication engine 130 may be configured to analyze patterns of conduct regarding how the user 202 communicates or participates with or against other players within the computer game 210. The types of possible interactions may differ based on the particular game being played (e.g., based on the types of interactions the game provides). For example, some games provide in-game person-to-person or person-to-group communication functionality (e.g., text-based communications such as text messaging, in-game email, group chat, world chat, or voice-based communications such as group chat, proximity chat, squad chat, team chat). Some games allow players to establish a "friends list" in which the user 202 identifies one or more other players as their "friend," thereby allowing easier tracking or communication with those subsets of players. Some games allow players to group together to perform certain tasks (e.g., raid groups, squads, teams). Some games allow players to designate who they will compete against (e.g., inviting another particular player to play in an online board game). As such, the authentic user gaming behavior profile 220 may include a behavioral aspect that identifies which other players the authentic user 202 typically communicates with, or plays with or against, while playing the particular computer game 210. Because, for example, players such as the authentic user 202 tend to communicate with, or play with or against, specific other players, this may be used to authenticate whether the suspect user is the authentic user 202.

In some embodiments, to evaluate patterns of conduct regarding device behaviors, the gaming behavior data 112, 204 may include device data associated with the devices used to play the computer game 210 (e.g., regarding the input device(s) 212, the gaining device 110, or other components thereof). For example, the authentication engine 130 may be configured to analyze patterns of conduct regarding a manufacturer type or product type of the gaming device 110 used by the user 202 (e.g., a Sony Playstation, or an Apple iPhone, or a Dell® laptop), or which particular gaming device 110 (e.g., a unique ID of the gaming device 110), or what type of input device(s) 212 the user 202 uses to play the computer game 210 (e.g., keyboard, mouse, flight stick, hand-held controller, touchscreen, and so forth). As such, the authentic user gaming behavior profile 220 may include a behavioral aspect that identifies which device type, device, or input devices 212 the user 202 uses while playing the particular computer game 210. Because, for example, players such as the authentic user 202 tend to use the same device, device type, and/or input devices 212, this may be used to authenticate whether the suspect user is the authentic user 202.

FIG. 3 illustrates an authentication application process in which the authentication engine 130 collects and uses suspect gaming behavior data 304 from a suspect user 302 to generate an authentication decision related to the suspect user 302 (e.g., whether the suspect user 302 is the authentic user 202). The suspect user 302 may be similar to the user 102 or the authentic user 202. In the example embodiment, the authentication engine 130 has established the authentic user gaming behavior profile 220 for the authentic user 202, and the suspect user 302 plays the computer game 210 via a gaming device 310 and, in some embodiments, the gaming server device 120. The gaming device 310 may be the gaming device 110, or similar to the gaming device 110. The suspect user 302 uses one or more input devices 312 while playing the computer game 210, through which the suspect user 302 interacts with the computer game 210 (e.g., moving an avatar within a computer game environment, or submitting moves, or communicating with other players through in-game communications features). The gaming device 310 also includes one or more communications interfaces 314 configured to, for example, provide networked communications between the gaming device 310 and the gaming server device 120, or the authentication engine 130 (e.g., via the network 104, not shown in FIG. 3).

During operation, the suspect user 302 plays the computer game 210 via the gaming device 310 and the input devices 312. During game play, gaming behavior data ("suspect gaming behavior data") 304 is generated (e.g., based on actions performed by the suspect user 302). This suspect gaming behavior data 304 may be similar to the gaming behavior data 112 described above with respect to FIG. 1 or the authentic gaming behavior data 204 described above with respect to FIG. 2, and may be similarly collected. Further, this suspect gaming behavior data 304 is associated with the suspect user 302.

The authentication engine 130 receives the suspect gaming behavior data 304 (e.g., from the gaming device 310 and/or from the gaming server device 120). The authentication engine 130 compares the suspect gaming behavior data 304 to the authentic user gaming behavior profile 220 to determine whether the suspect user 302 is the authentic user 202 (e.g., whether the behavior exhibited by the suspect user 302 falls into the expected behavior pattern as embodied by the authentic user gaming behavior profile 220).

More specifically, in the example embodiment, the authentication engine 130 examines the types of gaming behavior of the authentic user 202 that was captured in the authentic user gaming behavior profile 220. The profile 220, as described above, may include several different types of gaming behavior data 112, and may address gaming behavior for several different computer games 210. The authentication engine 130 identifies one or more aspects of gaming behavior data 112 present in the profile 220, and for one or more games 210 ("components of target gaming behavior" for one or more "target games"). These components of target gaming behavior represent the types of gaming behavior data 304 that the authentication engine 130 uses to compare the suspect user 302 to the authentic user 202. For example, the authentic user gaming behavior profile 220 for the authentic user 202 may include a first component associated with which other players the authentic user 202 regularly text chats while playing World of Warcraft, and a second component associated with how the authentic user 202 normally spends most of their in-game playing time while playing World of Warcraft. As such, when the suspect user 302 plays World of Warcraft (e.g., as the target game) on their gaming device 310, the authentic user gaming behavior profile 220 is configured to allow the authentication engine 130 to analyze behavior data of the suspect user 302 associated with those two components of behavior.

In the example embodiment, while the suspect user 302 plays any of the target games on the gaming device 310, the authentication engine 130 collects suspect gaming behavior data 304 for the types of behaviors matching the identified components of target gaming behavior. In other words, and in this example, the authentication engine 130 collects interaction data between the suspect user 302 and other players, and how the suspect user 302 spends their in-game playing time while playing World of Warcraft.

The authentication engine 130 then compares the suspect gaming behavior data 304 to the authentic user gaming behavior profile 220. More specifically, in the example embodiment, the authentication engine 130 compares each identified component of the suspect gaming behavior data 304 to the associated component of the authentic user gaming behavior profile 220.

In some embodiments, the suspect gaming behavior data 304 may be collected during a particular gaming session of a target game (e.g., defining a start date/time and/or an end date/time based on when the user 302 executes the game 210 and then later exits that game 210). In other embodiments, the suspect gaming behavior data 304 may be collected during a windowed period, such as the last days gaming behavior data 304, or the last week's behavior data 304 (e.g., deleting data as it becomes stale). In some embodiments, only the last sample collected from the suspect gaming behavior data 304 for an identified component may be used to compare to the authentic user gaming behavior profile 220.

For example, the authentication engine 130 may collect the user interaction data between the suspect user 302 and other players during the most recent single gaming session, as well as the amounts of time spent by the suspect user 302 in the various categories of conduct identified for the target game. The authentic user gaming behavior profile 220 may, for example, identify a set of six players with which the authentic user 202 communicates regularly (e.g., a "regular communicants list" comprising players for which the authentic user 202 communicates more than 2.0 times per session, on average). Presume, for example, that, during the single sampled gaming session, the suspect user 302 communicates with none of those six players, and instead communicates multiple times with multiple other players that do not appear on the regular communicants list. With respect to this component of behavior, the pattern of conduct of the suspect user 302 does not seem to match the past conduct of the authentic user 202. In the example embodiment, the authentication engine 130 generates a factor value between 0.0 and 1.0 associated with each component. The factor value represents a degree of similarity between the component of suspect gaming behavior data 304 and the associated component of authentic user gaming behavior profile 220 (e.g., a degree of confidence that the suspect user 302 is the authentic user 202), with 1.0 representing similarity and 0.0 representing dissimilarity.

Once the authentication engine 130 has compared the suspect gaming behavior data 304 to the authentic user gaming behavior profile 220, the authentication engine 130 generates an authentication decision with regard to the suspect user 302. In the example embodiment, each identified component for a particular game 210 has a factor value generated by the authentication engine 130. The authentication engine 130 combines the factor values for each of the identified components for each of the target games into a single behavioral similarity value, and the authentication engine 130 then uses the behavioral similarity value to generate the authentication decision. In some embodiments, the authentication engine 130 identifies a pre-determined threshold over which the suspect user 302 is deemed authentic (e.g., behavioral similarity value >0.95). In some embodiments, the authentication engine 130 identifies multiple pre-determined ranges for the behavioral similarity value, where each range defines a different level of trust. For example, a trust level may be defined as:

| Similarity Value Range | Trust Level |
| --- | --- |
| 0.95-1.00 | High |
| 0.85-0.94 | Medium |
| 0.75-0.84 | Low |
| 0.00-0.74 | Untrusted |

The trust levels may, alternatively, be defined by a set of pre-determined thresholds (e.g., High=0.95, Medium=0.85, Low=0.75, otherwise Untrusted).

In some embodiments, each data point in authentication may have a weighted factor (e.g., of multiple data point authentication) in contributing to the authentication of the player. This multiple data point authentication is referred to herein as "mdp authN". The multiple data points may be used as a factor in multi-factor authentication. In this example embodiment, the authentication engine 130 may compute a score:

$$mdpAuthNScore = \sum_{i=0}^{n} w_i d_i,$$

where n is the number of data points, $w_i$ is the weight assigned to the $i^{th}$ data point, and di is the observation of a data behavior associated with the $i^{th}$ data point. For example, one stored data point may indicate that the authentic player prefers to kill critters and, subsequently, the suspect player killed all 5 permissible critters in the specified 15 seconds. As such, d would be a large number (e.g., 10, on a scale of 1-10). If, on the other hand, the suspect player choses to tap urns, then d for this factor would be a low number (e.g., 1). And if this evaluation is being done for a very important task, then w will be a small number (e.g., 0.1, on a scale of 0.0-1.0). The higher the integrity of the authentication, the larger the number of data points and smaller the weight factor for each data point.

The final mdpAuthNScore is then mapped to either "successful authentication" or "failed authentication" based on a predetermined threshold (e.g., for the task at hand). The authentication engine 130 may use a single predetermined threshold for authentication (e.g., a default threshold), or may have different predetermined thresholds based on, for example, the application, or the type of task. For example, if the task is to view less-sensitive data (e.g., display tentative loan terms), then the threshold may be relatively low, where if the task involves sensitive information or sensitive operations (e.g., financial transactions, moving money, accessing financial accounts), then the threshold may be relatively high.

In some embodiments, the authentication engine 130 may provide the behavioral similarity value, or any or all of the individual component factor values, to the target system 140, or to the additional authentication systems 150. In some embodiments, the authentication engine 130 may provide the trust level to the target system 140, or to the additional authentication systems 150. In some embodiments, the authentication engine 130 acts as the sole authenticator for the target system 140 and either allows or disallows access for the suspect user 302 to the target system 140. In some embodiments, the target system(s) 140 may include multiple target services, and the authentication engine 130 may authenticate each service based on its own single behavioral similarity threshold (e.g., a first service may accept behavioral similarity scores above 0.75, where a second service may accept behavioral similarity scores only if above 0.95), or based on one of the defined trust levels (e.g., the first service may accept a trust level of medium or higher, where the second service may accept a trust level of low or higher).

In some embodiments, the authentication engine 130 may use the behavioral similarity value and/or the authentication decision as one of multiple factors for authentication. For example, the authentication decision may be part of a two-factor authentication, being used in conjunction with, for example, user-provided credentials such as a username and password (e.g., if either or both fail, then authentication is denied).

In the example embodiment, the authentication engine 130 may receive an authentication request associated with the suspect user 302 (e.g., from the gaming device 310, or otherwise). The authentication request may come directly to the authentication engine 130 (e.g., from the gaming device 310), or the target system 140 may initially receive the authentication request and then contact the authentication engine 130 to authenticate the authentication request (e.g., as an authentication service). The authentication request is initiated by the suspect user 302, and identifies the authentic user 202 (e.g., via an account ID associated with the authentic user 202) and the gaming device 310 (e.g., based on the authentication request originating from the gaming device 310). In the example embodiment, the suspect gaming behavior data 304 has already been collected (e.g., prior to the authentication request), and the authentication engine 130 performs the comparison of the suspect gaming behavior data 304 to the authentic user gaming behavior profile 220 for the authentic user 202 based on receipt of the authentication request. In other embodiments, the authentication engine 130 may receive the suspect gaming behavior data 304 after receipt of the authentication request (e.g., may pull the suspect gaming behavior data 304 from the gaming device 310), and then perform the comparison. Once the comparison is complete, the authentication engine 130 renders the determined authentication decision for the authentication request, thereby completing the authentication request based on the gaming behavior of the suspect user 302 as compared to the authentic user 202.

Figure 4:
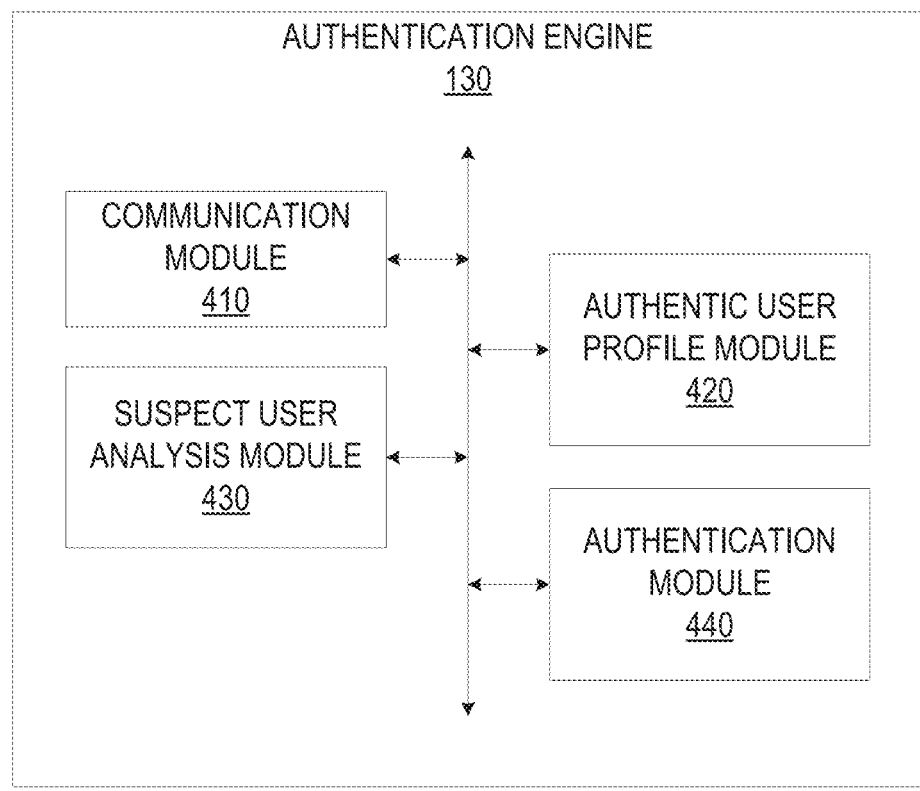
FIG. 4 is a component diagram of the authentication engine shown in FIGS. 1-3.

FIG. 4 is a component diagram of the authentication engine 130. In the example embodiment, the authentication engine 130 includes a communication module 410, an authentic user profile module 420, a suspect user analysis module 430, and an authentication module 440. The communication module 410 performs operations associated with network-based communications between the authentication engine 130 and other components of the authentication system 100 as described herein such as, for example, for receiving gaming behavior data 112, 204, 304 from the gaming devices 110, 310 and/or the gaming server devices 120, or for providing authentication services to the target systems 140, or for communicating with the additional authentication systems 150.

The authentic user profile module 420, in the example embodiment, performs operations associated with the authentic user 202 as described herein such as, for example, processing authentic gaming behavior data 204 to generate the authentic user gaming behavior profile 220. The suspect user analysis module 430 performs operations associated with the suspect user 302 as described herein such as, for example, comparing suspect gaming behavior data 304 to the authentic user gaming behavior profile 220 to generate factor values. The authentication module 440 performs operations associated with providing the authentication decision regarding the suspect user 302 as described herein such as, for example, generating the behavioral similarity value from the factor values, allowing or denying authentication requests from the suspect user 302 and/or the gaming device 310, or providing the authentication decision or associated values to the target systems 140 or the additional authentication systems 150.

Figure 5:
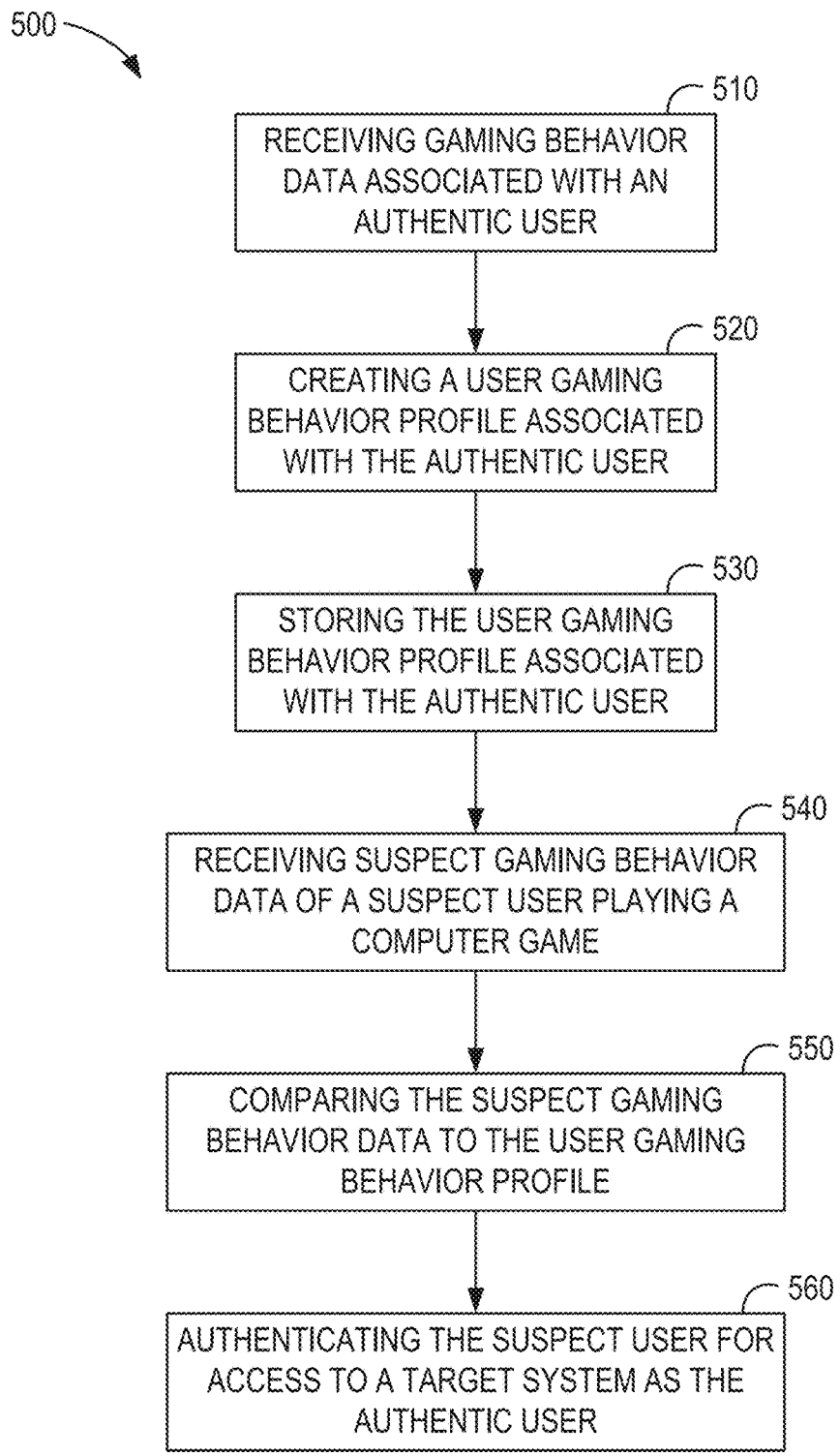
FIG. 5 illustrates an example computer-implemented method for authenticating a suspect user based on gaming behavior data.

FIG. 5 illustrates an example computer-implemented method 500 for authenticating the suspect user 302 based on gaming behavior data 112. The computer-implemented method 500, hereafter referred to as "the method 500," is performed by a computing device comprising at least one hardware processor and a memory. In some embodiments, the method 500 includes receiving gaming behavior data 112 associated with an authentic user 202 playing the computer game 210, the gaming behavior data 112 includes the at least one component of behavior (see operation 510), creating a user gaming behavior profile using the at least one component of behavior (see operation 520), and storing the user gaming behavior profile, the user gaming behavior profile is associated with the other user (see operation 530).

In the example embodiment, the method 500 includes receiving suspect gaming behavior data 304 associated with a suspect user 302 playing a computer game 210 on a gaming device 310 (see operation 540). The method 500 also includes comparing the suspect gaming behavior data 304 to a user gaming behavior profile associated with another user, the user gaming behavior profile includes at least one component of behavior associated with the other user and the computer game 210 representing a pattern of conduct of the other user (see operation 550). The method 500 further includes authenticating the suspect user 302 for access to a target system 130 as the other user based on the comparing (see operation 560).

In some embodiments, the at least one component of behavior is associated with a physical behavior of the other user during one or more playing sessions of the computer game 210, and the physical behavior is associated with the other user manipulating an input device 312 of the gaming device 310. In some embodiments, the at least one component of behavior is associated with a cerebral behavior of the other user during one or more playing sessions of the computer game 210, and the cerebral behavior is associated with at least one decision made by the other user and associated with the computer game 210. In some embodiments, the at least one component of behavior is associated with an interaction behavior of the other user during one or more playing sessions of the computer game 210, and the interaction behavior is associated with one or more interactions between the other user and other players of the computer game 210. In some embodiments, the at least one component of behavior is associated with a device behavior of the other user during one or more playing sessions of the computer game 210, and the device behavior is associated with one or more computing devices with which the other user plays the computer game 210. In some embodiments, the method 500 further includes expiring a pre-existing authentication on the gaming device based on gaming behavior performed on the gaming device.

Figure 6:
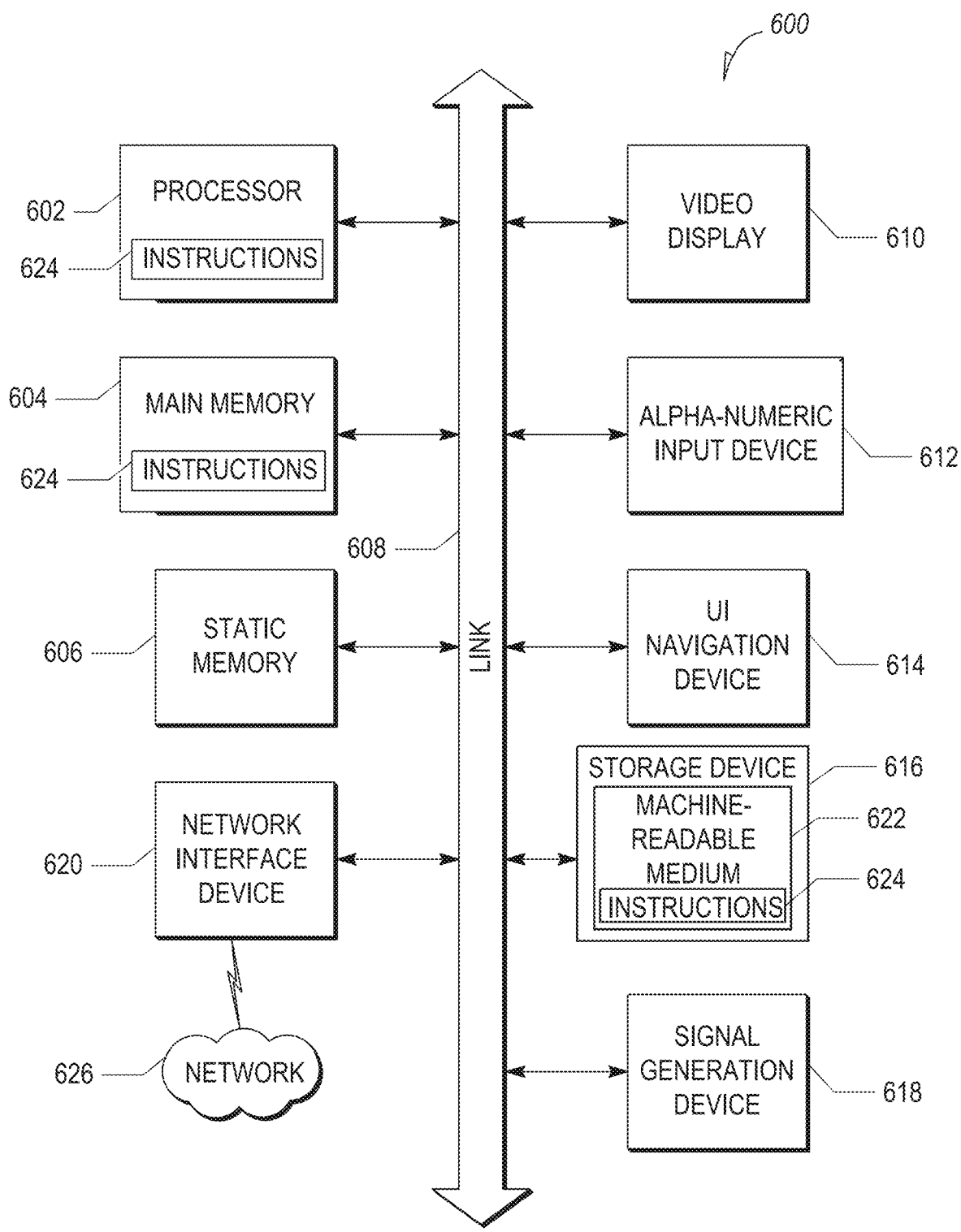
FIG. 6 is a block diagram illustrating a machine in the example form of a computer system, within which a set or sequence of instructions can be executed to cause the machine to perform any one of the methodologies discussed herein, such as the authentication engine, according to an example embodiment.

FIG. 6 is a block diagram illustrating a machine in the example form of a computer system 600, within which a set or sequence of instructions can be executed to cause the machine to perform any one of the methodologies discussed herein, such as the authentication engine 130, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes at least one processor 602 (e.g. a central processing unit (CPU), a graphics processing unit (GPU) or both, processor cores, compute nodes, etc.), a main memory 604 and a static memory 606, which communicate with each other via a link 608 (e.g., bus). The computer system 600 can further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 can additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 can also reside, completely or at least partially, within the main memory 604, static memory 606, and/or within the processor 602 during execution thereof by the computer system 600, with the main memory 604, static memory 606, and the processor 602 also constituting machine-readable media 622.

While the machine-readable medium 622 is illustrated, in an example embodiment, to be a single medium, the term "machine-readable medium" can include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions (e.g., instructions 624) for execution by the machine and that cause the machine to perform any one or more of the methodologies of the present disclosure or that is capable of storing, encoding or carrying data structures utilized by or associated with such instructions 624. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 can further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method comprising:
   receiving, via an application programming interface (API), first gaming behavior data associated with a first user playing a computer game, the first gaming behavior data including at least one component of behavior;
   storing, in a data store, a user gaming behavior profile created using the at least one component of behavior, the user gaming behavior profile stored as associated with the first user;
   receiving, via the API, suspect gaming behavior data associated with a suspect user playing the computer game on a gaming device, the suspect gaming behavior data including a component of behavior;
   comparing the component of behavior in the suspect gaming behavior data to the at least one component of behavior in the user gaming behavior profile associated with the first user, the computer game representing a pattern of conduct of the first user; and
   based on the comparing, authenticating the suspect user for access to a target system as the first user.

2. The method of claim 1, wherein the at least one component of behavior is associated with interaction behavior of the first user during a playing session of the computer game, the interaction behavior associated with a common opponent played in the computer game.

3. The method of claim 1, wherein the at least one component of behavior is associated with interaction behavior of the first user during a playing session of the computer game, the interaction behavior associated with team events in the computer game.

4. The method of claim 1, wherein the at least one component of behavior includes a first component of behavior data associated with interaction behavior of the first user during a playing session of the computer game and a second component of behavior data associated with device behavior data of the first user during the playing session.

5. The method of claim 1, wherein the at least one component of behavior includes a type of the gaming device used to play the computer game.

6. The method of claim 1, wherein the at least one component of behavior is associated with cerebral behavior of the first user during a playing session of the computer game, the cerebral behavior identifying a distribution of time in different categories of conduct within the computer game.

7. The method of claim 1, wherein the at least one component of behavior is tailored to the computer game.

8. A system comprising:
   at least one processor; and
   a storage device comprising instructions, which when executed by the at least one processor, configure the at least one processor to perform operations comprising:
      receiving, via an application programming interface (API), first gaming behavior data associated with a first user playing a computer game, the first gaming behavior data including at least one component of behavior;
      storing, in a data store, a user gaming behavior profile created using the at least one component of behavior, the user gaming behavior profile stored as associated with the first user;
      receiving, via the API, suspect gaming behavior data associated with a suspect user playing the computer game on a gaming device, the suspect gaming behavior data including a component of behavior;
      comparing the component of behavior in the suspect gaming behavior data to the at least one component of behavior in the user gaming behavior profile associated with the first user, the computer game representing a pattern of conduct of the first user; and
      based on the comparing, authenticating the suspect user for access to a target system as the first user.

9. The system of claim 8, wherein the at least one component of behavior is associated with interaction behavior of the first user during a playing session of the computer game, the interaction behavior associated with a common opponent played in the computer game.

10. The system of claim 8, wherein the at least one component of behavior is associated with interaction behavior of the first user during a playing session of the computer game, the interaction behavior associated with team events in the computer game.

11. The system of claim 8, wherein the at least one component of behavior includes a first component of behavior data associated with interaction behavior of the first user during a playing session of the computer game and a second component of behavior data associated with device behavior data of the first user during the playing session.

12. The system of claim 8, wherein the at least one component of behavior includes a type of the gaming device used to play the computer game.

13. The system of claim 8, wherein the at least one component of behavior is associated with cerebral behavior of the first user during a playing session of the computer game, the cerebral behavior identifying a distribution of time in different categories of conduct within the computer game.

14. The system of claim 8, wherein the at least one component of behavior is tailored to the computer game.

15. A non-transitory computer-readable medium comprising instructions, which when executed by at least one processor, configure the at least one processor to perform operations comprising:
  receiving, via an application programming interface (API), first gaming behavior data associated with a first user playing a computer game, the first gaming behavior data including at least one component of behavior;
  storing, in a data store, a user gaming behavior profile created using the at least one component of behavior, the user gaming behavior profile stored as associated with the first user;
  receiving, via the API, suspect gaming behavior data associated with a suspect user playing the computer game on a gaming device, the suspect gaming behavior data including a component of behavior;
  comparing the component of behavior in the suspect gaming behavior data to the at least one component of behavior in the user gaming behavior profile associated with the first user, the computer game representing a pattern of conduct of the first user; and
  based on the comparing, authenticating the suspect user for access to a target system as the first user.

16. The non-transitory computer-readable medium of claim 15, wherein the at least one component of behavior is associated with interaction behavior of the first user during a playing session of the computer game, the interaction behavior associated with a common opponent played in the computer game.

17. The non-transitory computer-readable medium of claim 15, wherein the at least one component of behavior is associated with interaction behavior of the first user during a playing session of the computer game, the interaction behavior associated with team events in the computer game.

18. The non-transitory computer-readable medium of claim 15, wherein the at least one component of behavior includes a first component of behavior data associated with interaction behavior of the first user during a playing session of the computer game and a second component of behavior data associated with device behavior data of the first user during the playing session.

19. The non-transitory computer-readable medium of claim 15, wherein the at least one component of behavior includes a type of the gaming device used to play the computer game.

20. The non-transitory computer-readable medium of claim 15, wherein the at least one component of behavior is associated with cerebral behavior of the first user during a playing session of the computer game, the cerebral behavior identifying a distribution of time in different categories of conduct within the computer game.

* * * * *